United States Patent
Wang et al.

(10) Patent No.: US 9,830,024 B2
(45) Date of Patent: Nov. 28, 2017

(54) ADD-ON TOUCH DEVICE AND SENSING MODULE THEREOF

(71) Applicant: WISTRON CORPORATION, New Taipei (TW)

(72) Inventors: Kuo-Hsing Wang, New Taipei (TW); Ming-Hua Hung, New Taipei (TW)

(73) Assignee: Wistron Corporation, New Taipei (TW)

( * ) Notice: Subject to any disclaimer, the term of this patent is extended or adjusted under 35 U.S.C. 154(b) by 2 days.

(21) Appl. No.: 14/471,140

(22) Filed: Aug. 28, 2014

(65) Prior Publication Data
US 2015/0153905 A1    Jun. 4, 2015

(30) Foreign Application Priority Data
Dec. 3, 2013    (TW) .............................. 102144296 A

(51) Int. Cl.
*G06F 3/041*    (2006.01)
*G06F 3/042*    (2006.01)
*G06F 1/16*    (2006.01)

(52) U.S. Cl.
CPC .......... *G06F 3/0428* (2013.01); *G06F 1/1607* (2013.01); *G06F 3/042* (2013.01)

(58) Field of Classification Search
CPC .................. G06F 1/169; G06F 3/0428; G06F 2203/04109
See application file for complete search history.

(56) References Cited

U.S. PATENT DOCUMENTS

| 2007/0211036 | A1* | 9/2007 | Perkins ................. | G06F 1/1615 345/173 |
| 2009/0213094 | A1* | 8/2009 | Bridger ................ | G06F 3/0421 345/175 |
| 2010/0156820 | A1* | 6/2010 | Lin ....................... | G06F 3/0421 345/173 |
| 2012/0287674 | A1* | 11/2012 | Nichol ................ | G02B 6/0018 362/611 |

FOREIGN PATENT DOCUMENTS

TW    201025098 A    7/2010

OTHER PUBLICATIONS

Communication from the Chinese Patent Office in a counterpart foreign application dated Mar. 15, 2017, with partial translation.
Official Action From Taiwan Patent Office dated Aug. 8, 2017.

* cited by examiner

*Primary Examiner* — Towfiq Elahi
(74) *Attorney, Agent, or Firm* — Rosenberg, Klein & Lee

(57) ABSTRACT

An add-on touch device and the sensing module combination is presented. The add-on touch device has at least a sensing module and a plurality of fixing modules. The sensing module and the plurality of fixing modules are disposed on the four edges of a display and connected by at least a reflective connector for forming a touch area corresponding to a display area of the display. The touch area covers the display area, so that the sensing module can sense the position in the display area touched by a user in the touch area. The length of the reflective connector of the add-on touch device is adjusted according to the sum of the distances between the sensing module and the plurality of fixing modules; the sum of the distances between the sensing module and the plurality of fixing modules changes according to the size of the display.

24 Claims, 16 Drawing Sheets

ADD-ON TOUCH DEVICE AND SENSING MODULE THEREOF

FIELD OF THE DISCLOSURE

The present disclosure relates generally to a touch device and the sensing module thereof, and particularly to an add-on touch device and the sensing module thereof applicable to displays of various sizes.

BACKGROUND OF THE DISCLOSURE

With the continuous progress of technologies, displays have evolved from traditional displays to liquid crystal displays or even touch displays. General liquid crystal displays need at least an input device, such as keyboard or mouse, to control the pointer on displays and perform clicking or typing operations. For touch displays, no mouse is required. A user can control the pointer and type by touching displays directly. Thanks to the omission of input devices, the space occupied by computers is reduced; the location for placing computers will be less limited. In addition, due to their simple operational methods, touch displays are easier and friendlier for the elderly and children.

Nonetheless, no matter resistive or capacitive touch displays, many components, including touch panels and touch control chips, are required. Unfortunately, the components described above are costly. Besides, modern computers have already equipped with displays. If the original undamaged displays are replaced directly by touch displays, the cost will be expensive; it is also wasting resources and against the trend of environmental protection. Thereby, there is an add-on optical touch screen in the market. The add-on optical touch screen is disposed on a current liquid crystal display and thus enabling a general liquid crystal to have touch functions.

The size of the add-on optical touch screen described above is fixed and unadjustable, making it applicable only to displays of a single size. As the display is changed to another size, a new add-on optical touch screen has to be purchased. Moreover, because the size of current add-on optical touch screens becomes larger as the display size increases, they will occupy a large space for storage.

SUMMARY

An objective of the present disclosure is to provide an add-on touch device and the sensing module thereof, which can contract or enlarge according to the size of displays for fitting displays of various sizes. In addition, while storing, the volume of the add-on touch device can be shrunk for reducing the occupied space.

Another objective of the present disclosure is to provide an add-on touch device and the sensing module thereof, which have simple structures for achieving the effect of easy assembling.

In order to achieve the objectives and effects described above, the present disclosure discloses an add-on touch device applied to a display and comprising at least two sensing modules and at least two fixing modules. The sensing modules are disposed on the four edges of the display; each sensing module includes an optomechanical component. The fixing modules are disposed on the four edges of the display. The plurality of sensing modules and the plurality of fixing modules are connected by at least a reflective connector, forming a touch area. The touch area corresponds to a display area of the display; and the plurality of optomechanical components face to the touch area.

The present disclosure further provides an add-on touch device applied to a display and comprising at least four sensing modules disposed on the four edges of the display. Each sensing module includes an optomechanical component. The plurality of sensing modules are connected by at least a reflective connector, forming a touch area. The touch area corresponds to a display area of the display; and the plurality of optomechanical components face to the touch area.

The present disclosure further provides an add-on touch device applied to a display and comprising a sensing module and at least four fixing modules. The sensing module is disposed at the central position of one of the four edges of the display and includes an optomechanical component. The fixing modules are disposed on the four edges of the display. The sensing module and the plurality of fixing modules are connected by at least a reflective connector, forming a touch area. The touch area corresponds to a display area of the display; and the plurality of optomechanical component faces to the touch area.

The present disclosure provides a sensing module, which comprises a housing, at least a fixing member, and a reflective connector. The housing has a first opening, a second opening, and a third opening. The first opening is located on a first side of the housing; the second opening is located on a second side of the housing; the third opening faces to the touch area; and the optomechanical component is disposed in the housing and faces to the third opening. The fixing member is disposed on a surface of the housing and fixed to the edge of a display. Besides, the first end of the reflective connector is fixed in the housing; and the second end of the reflective connector passes through the first opening of the housing.

DETAILED DESCRIPTION

In order to make the structure and characteristics as well as the effectiveness of the present disclosure to be further understood and recognized, the detailed description of the present disclosure is provided as follows along with embodiments and accompanying figures.

The size of the add-on optical touch screen according to the prior art is fixed and unadjustable according to the display size, therefore add-on optical touch screens of various sizes have to be purchased for fitting different display sizes. Moreover, because the size of add-on optical touch screens cannot be adjusted, as their size increases, the volume increases accordingly, and thus requiring more space for storage. Thereby, the present disclosure provides an adjustable add-on touch device for solving the above problems.

Figure 1:
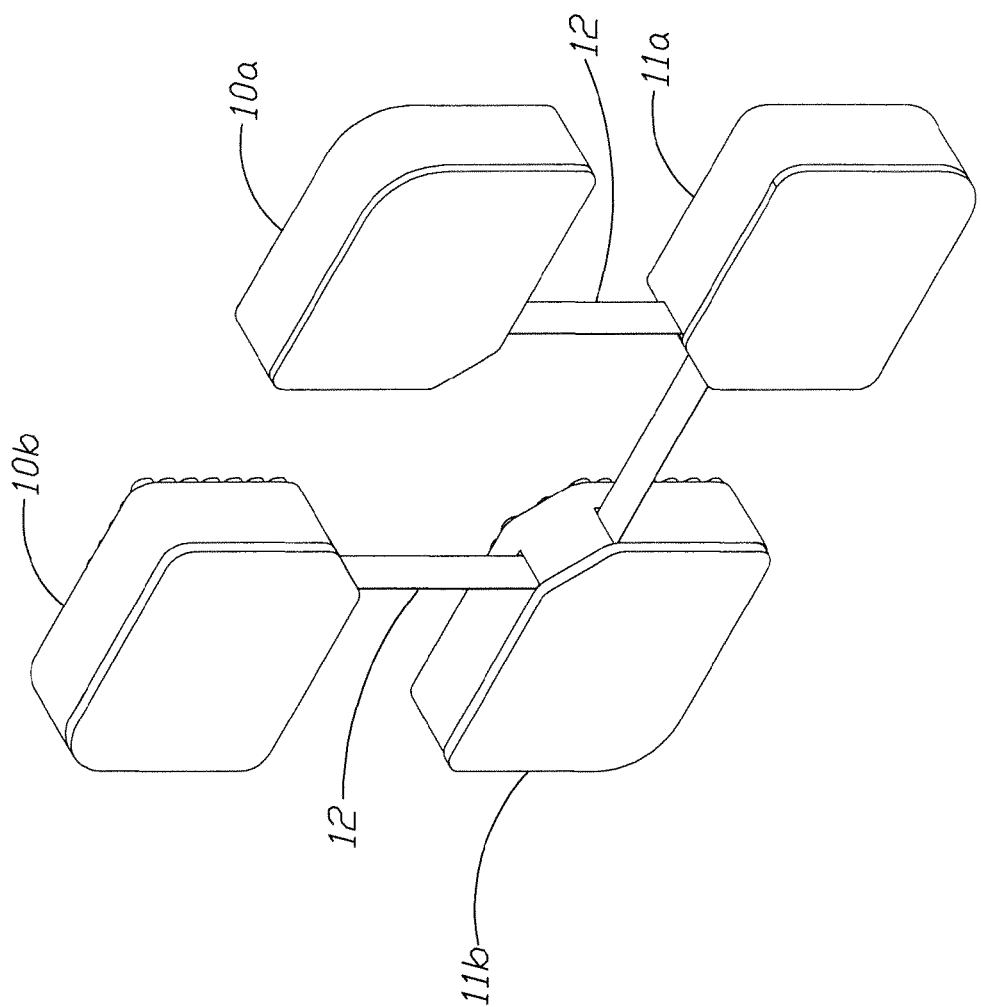
FIG. 1 shows a schematic diagram of the add-on touch device according the first embodiment of the present disclosure.
Figure 2:
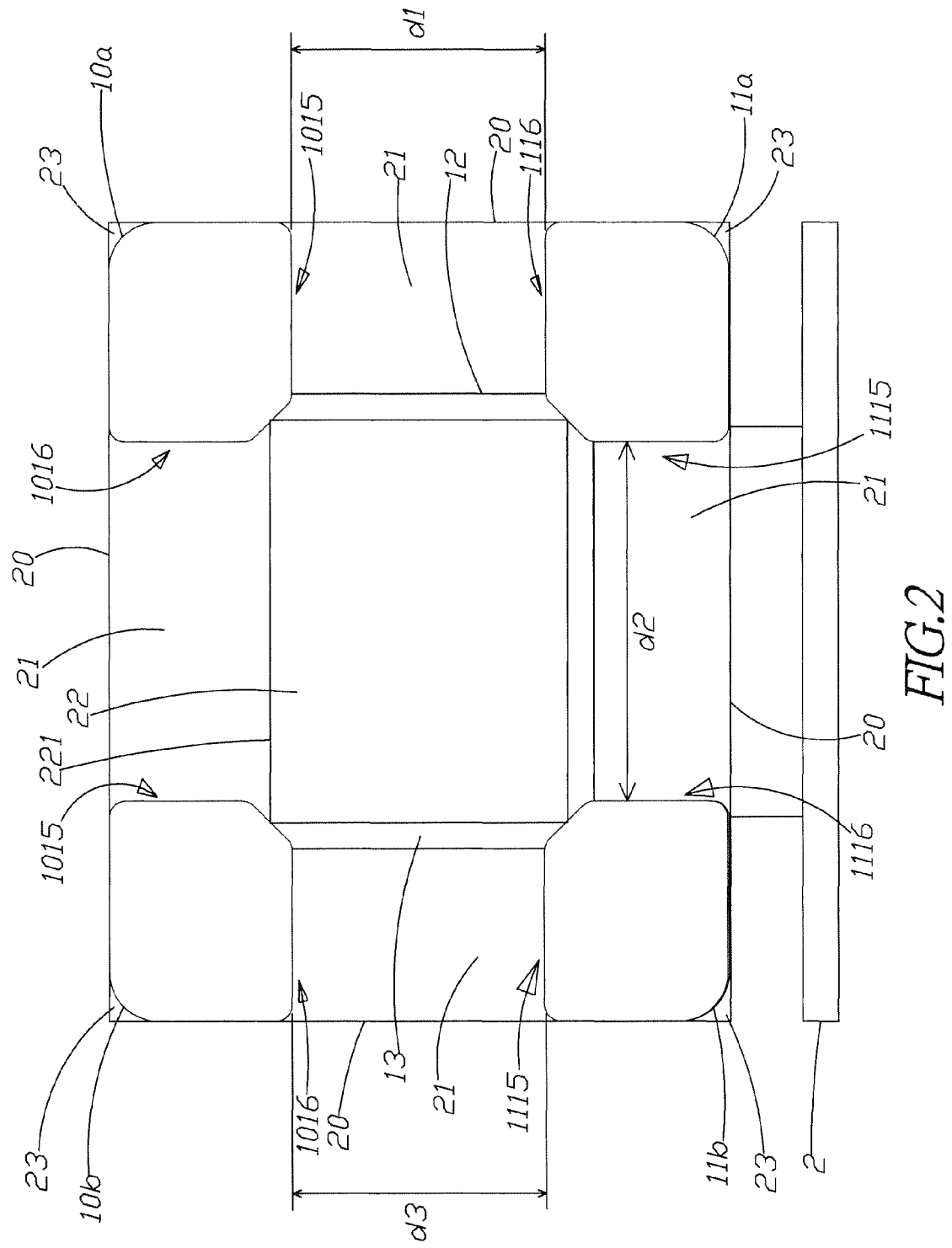
FIG. 2 shows a usage status diagram of the add-on touch device according the first embodiment of the present disclosure.

Please refer to FIG. 1 and FIG. 2, which shows a schematic diagram and a usage status diagram of the add-on touch device according the first embodiment of the present disclosure. As shown in the figures, the present embodiment provides an add-on touch device 1, which comprises two sensing modules and two fixing modules. For simplicity, the two sensing modules are named as the first sensing module 10a and the second sensing module 10b, respectively; the two fixing modules are named as the first fixing module 11a and the second fixing module 11b, respectively. The first sensing module 10a, the second sensing module 10b, the first fixing module 11a, and the second fixing module 11b are disposed on the four edges 21 of a display 2. The four edges 21 of the display 2 refer to the region between the four borders 20 of the display 2 and the borders 221 of a display area 22. In addition, the first sensing module 10a according to the present embodiment is located at the upper right corner 23 of the display 2; the first fixing module 11a is located at the bottom right corner 23 of the display 2; the second fixing module 11b is located at the bottom left corner 23 of the display 2; and the second sensing module 10b is located at the upper left corner 23 of the display 2.

Furthermore, the first sensing module 10a, the first fixing module 11a, the second fixing module 11b, and the second sensing module 10b are connected by a reflective connector 12 and forming a touch area 13. The touch area 13 corresponds to the display area 22 of the display 2. The touch area 13 covers the display area 22, which means that the area of the touch area 13 is greater than or equal to that of the display area 22. Basically, the plurality of sensing modules and the plurality of fixing modules are disposed at the four corners 23 of the display 2, so that the touch area 13 formed by connecting the plurality of sensing modules and the plurality of fixing modules covers the display area 22. The number of the sensing modules or the fixing modules of the add-on touch device 1 can be increased and the added sensing modules or the fixing modules can be disposed between the plurality of sensing modules and fixing modules at the four corners 23.

Figure 3:
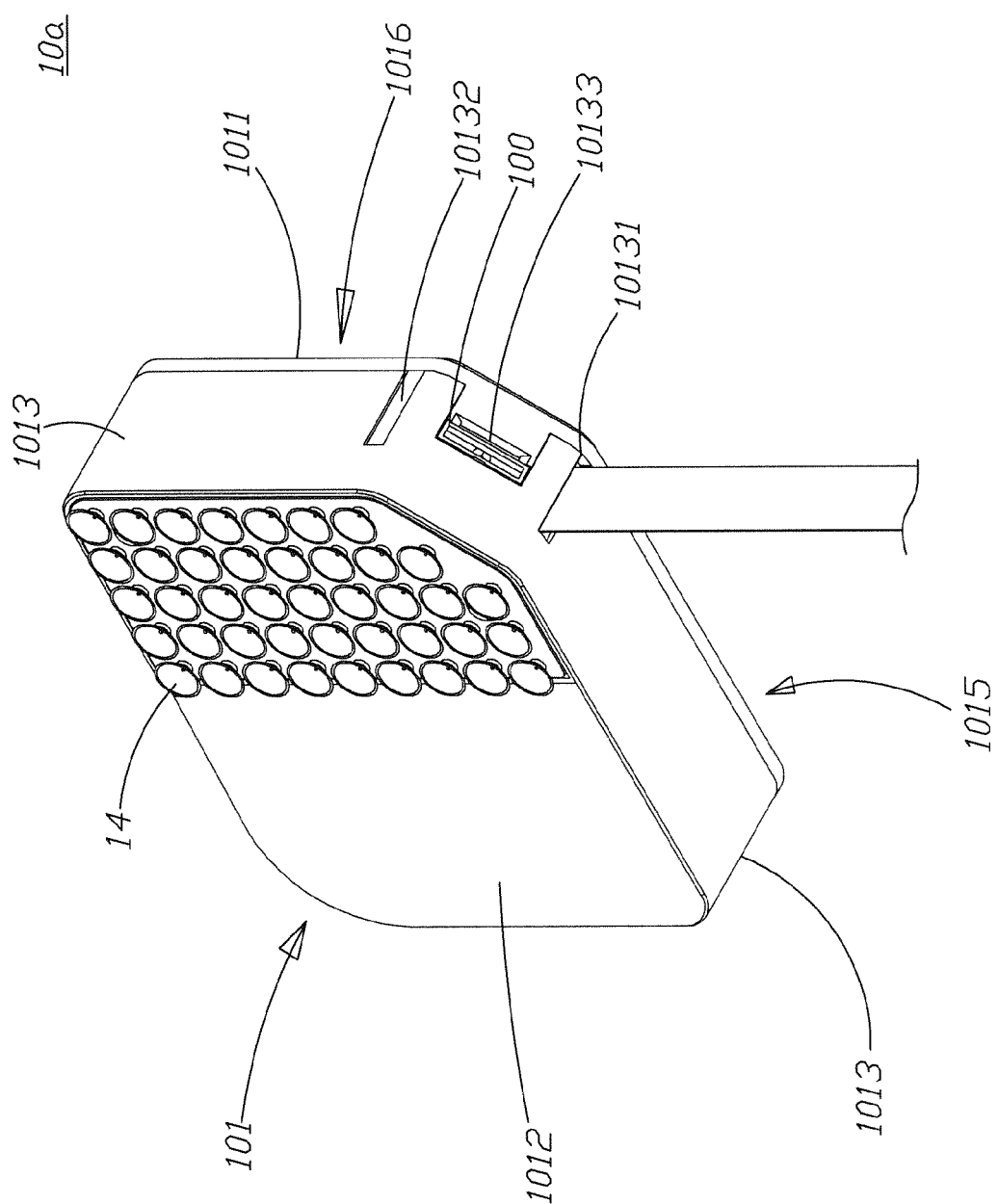
FIG. 3 shows a three-dimensional view of the sensing module according the first embodiment of the present disclosure.
Figure 4:
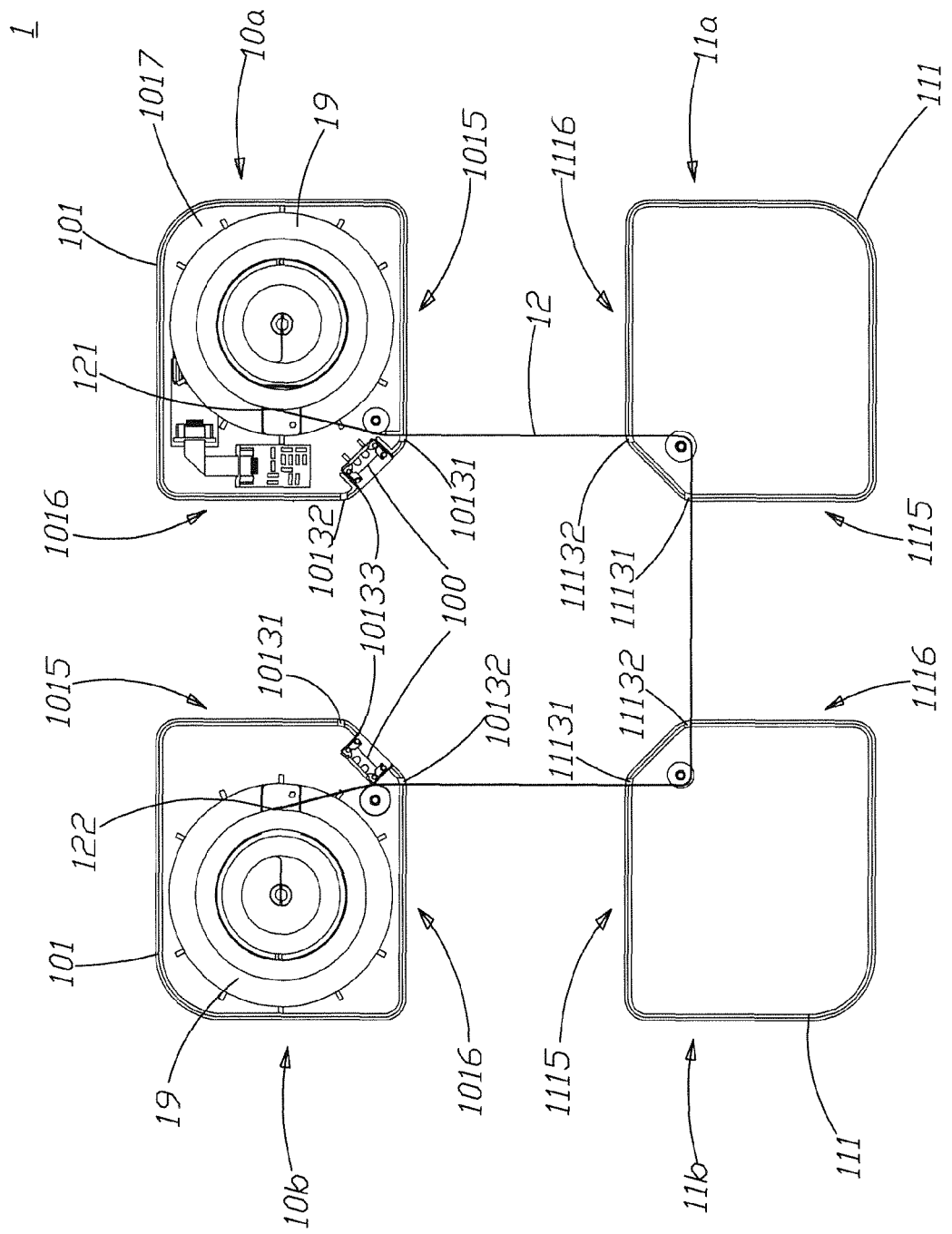
FIG. 4 shows a schematic diagram inside the add-on touch device according the first embodiment of the present disclosure.
Figure 5:
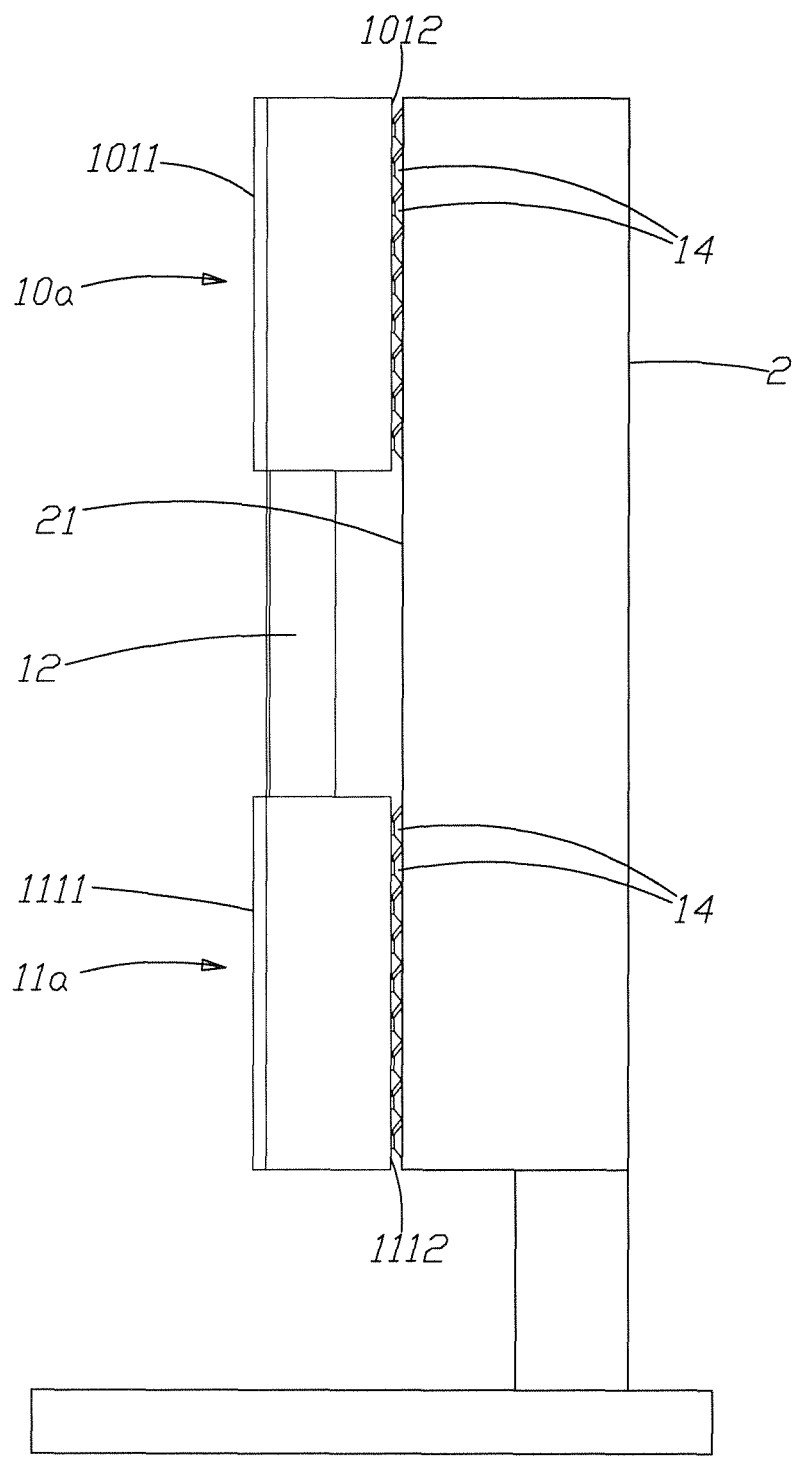
FIG. 5 shows a usage status diagram of the add-on touch device according the first embodiment of the present disclosure.

Please refer to FIGS. 3, 4, and 5, which show a three-dimensional view of the sensing module, a schematic diagram inside the add-on touch device, and another usage status diagram according the first embodiment of the present disclosure. As shown in the figures, the first and second sensing modules 10a, 10b have an optomechanical component 100, respectively. The two optomechanical components 100 of the first and second sensing modules 10a, 10b face to the touch area 13. When a user touches the display area 22 of the display 2 in the touch area 13, the two optomechanical components 100 of the first and second sensing modules 10a, 10b sense the touch location of the user in the display area 22 and generate at least a sensing signal to a computer (not shown in the figure). Then the computer controls the content displayed on the display 2 according to the sensing signal.

In the following, the structures of the sensing modules and the fixing modules will be described in details. The structures of the first and second sensing modules 10a, 10b are identical. Hence, the first sensing module 10a is used for description. The first sensing module 10a comprises a housing 101, which has a first surface 1011, a second surface 1012, and a sidewall 1013. The sidewall 1013 is located between the first and second surfaces 1011, 1012. The second surface 1012 has at least a fixing member 14. The housing 101 is disposed on the edge 21 of the display 2 via the fixing member 14. According to the present embodiment, a plurality of fixing members 14 are disposed on the second surface 1012 of the housing 101. Each fixing member 14 is a sucker attached to the edge 21 of the display 2 for disposing the first sensing module 10a to the edge 21 of the display 2, as shown in FIG. 5. Alternatively, a single fixing member 14 can be adopted as well. The fixing member 14 can be a screw, a rivet, re-attachable glue, or other devices capable of disposing the housing 101 on the edge 21 of the display 2. The details will not be described further.

The housing 101 has a first side 1015 and a second side 1016. The extension direction of the first side 1015 of the housing 101 according to the present embodiment intersects with and is perpendicular to that of the second side 1016 of the housing 101. The sidewall 1013 on the first side 1015 has a first opening 10131; the sidewall 1013 on the second side 1016 has a second opening 10132; the sidewall 1013 between the first and second sides 1015, 106 has a third opening 10133. The housing 101 contains an accommodating space 1017. The optomechanical component 100 is disposed inside the housing 101 and located in the accommodating space 1017. A sensing end of the optomechanical component 100 corresponds to the third opening 10133 for exposing the transmitting end and the sensing end of the optomechanical component 2 for sensing.

Figure 6:
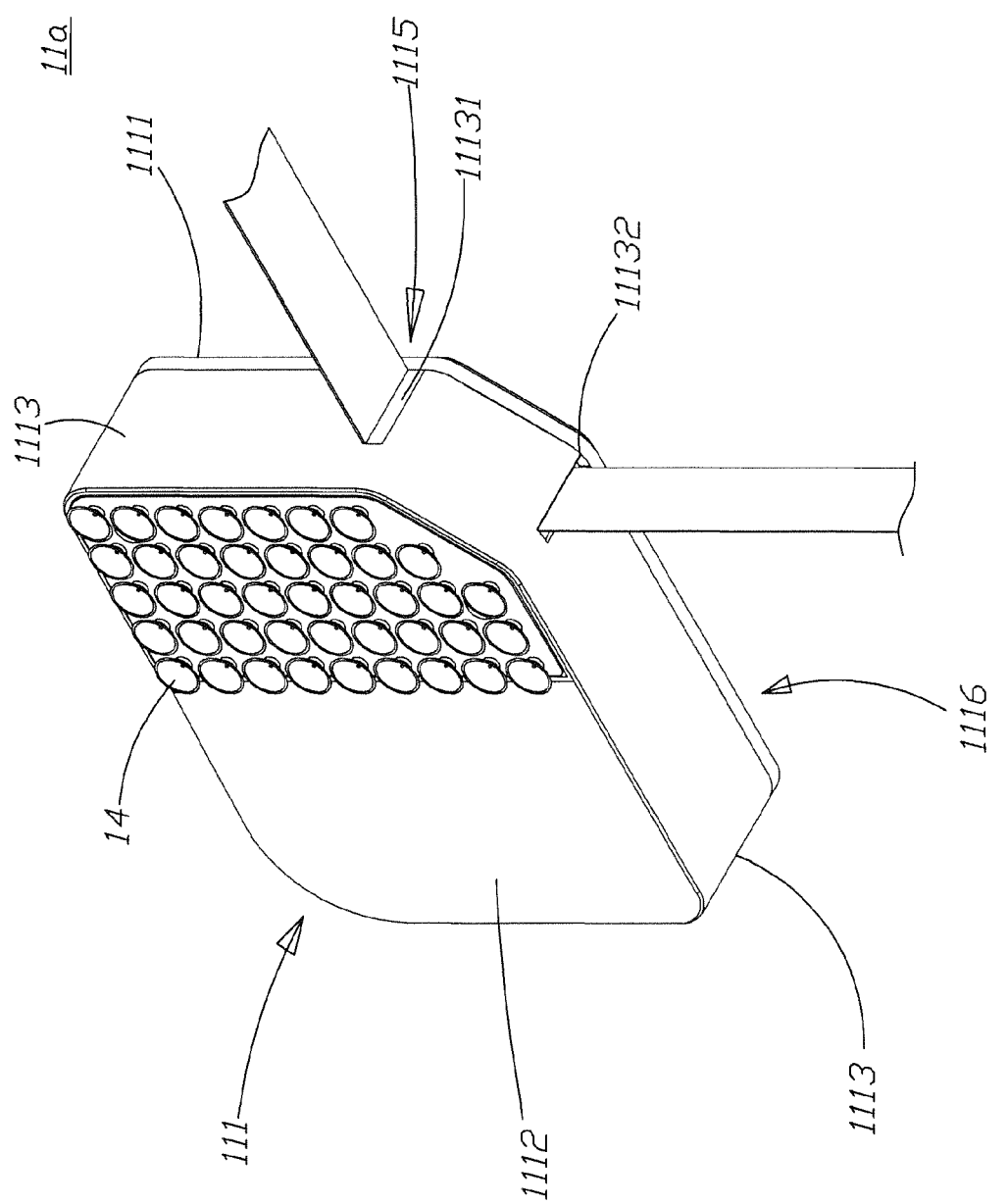
FIG. 6 shows a schematic diagram of the fixing module according the first embodiment of the present disclosure.

Please refer to FIG. 6, which shows a schematic diagram of the fixing module according the first embodiment of the present disclosure. As shown in the figure, the difference between the structures of the first fixing module 11a and the first sensing module 10a is that the first fixing module 11a does not contain the optomechanical component 100. Thereby, it is allowable that the fixing module does not include the third opening 10133 of the first sensing module 10a. Alternatively, the first fixing module 11a can use the housing 101 of the first sensing module 10*a* directly and include no optomechanical component in the housing 101. The details will not be described further. Accordingly, the first fixing module 11*a* according to the present embodiment also comprises a housing 111, which also has a first surface 1111, a second surface 1112, and a sidewall 1113 located between the first and second surfaces 1111, 1112. The second surface 1112 of the housing 111 also has at least a fixing member 14. A first opening 11131 is located on the sidewall 1113 of a first side 1115 of the housing 111; and a second opening 11132 is located on the sidewall 1113 of a second side 1116 of the housing 111.

Please refer to FIG. 2 again. When the first sensing module 10*a*, the second sensing module 10*b*, the first fixing module 11*a*, and the second fixing module 11*b* are disposed on the four edges 21 of the display 2, the first side 1015 of the first sensing module 10*a* at the upper right corner 23 of the display 2 corresponds to the second side 1116 of the first fixing module 11*a* at the bottom right corner 23 of the display 2; the first side 1115 of the first fixing module 11*a* at the bottom right corner 23 of the display 2 corresponds to the second side 1116 of the second fixing module 11*b* at the bottom left corner 23 of the display 2; the first side 1115 of the second fixing module 11*b* at the bottom left corner 23 of the display 2 corresponds to the second side 1016 of the second sensing module 10*b* at the upper left corner 23 of the display 2; the first side 1015 of the second sensing module 10*b* at the upper left corner 23 of the display 2 corresponds to the second side 1016 of the first sensing module 10*a* at the upper right corner 23 of the display 2. Thereby, the first sides 1015, 1115 of the sensing module or the fixing module correspond to second sides 1016, 1116 of the neighboring sensing module or fixing module; the second sides 1016, 1116 of the sensing module or the fixing module correspond to first sides 1015, 1115 of the neighboring sensing module or fixing module. Moreover, the two third openings 10133 of the first and second sensing modules 10*a*, 10*b* according to the present embodiment face to the display area 22 of the display 2 for making the sensing ends of the two optomechanical components 100 inside the first and second sensing modules 10*a*, 10*b* face to the display area 22. Thus, the two optomechanical components 100 can sense the display area 22.

Please refer again to FIG. 4. The reflective connector 12 according to the present embodiment has a first end 121 and a second end 122. The first end 121 of the reflective connector 12 is fixed in the housing 101 of the first sensing module 10*a*; the second end 122 of the reflective connector 12 passes and exits the first opening 10131 of the housing 101 of the first sensing module 10*a*, enters the second opening 11132 of the housing 111 of the first fixing module 11*a*, and then passes and exits the first opening 11131 of the housing 111 of the first fixing module 11*b*. Next, likewise, the second end 122 of the reflective connector 12 passes through the second opening 11132 and the first opening 11131 of the housing 111 of the second fixing module 11*b* sequentially. Finally, the second end 122 of the reflective connector 12 enters the second opening 10132 of the housing 101 of the second sensing module 10*b* and is fixed in the second sensing module 10*b* for forming a touch area 13 corresponding to the display area 22 of the display 2. Because the first and second sensing modules 10*a*, 10*b* according to the present embodiment are both disposed on the upper edge 21 of the display 2, the two optomechanical components 100 in the first and second sensing modules 10*a*, 10*b* emit a sensing light source towards the bottom left and the bottom right directions of the display 2, respectively.

Thereby, the reflective connector 12 needs to surround the left edge 221, the bottom edge 221, and the right edge 221 of the display area 22 only for reflecting the sensing light sources and avoiding dissipation of the plurality of sensing light sources due to scattering. Accordingly, it is allowable that the reflective connector 12 according to the present embodiment does not run from the second sensing modules 10*b* to the first sensing module 10*a*. Alternatively, the second end 122 of the reflective connector 12 can pass the second opening 10132 and the first opening 10131 of the housing 101 of the second sensing module 10*b* sequentially and be fixed in the second opening 10132 of the housing 101 of the first sensing module 10*a*, namely, running from the second sensing module 10*b* to the first sensing module 10*a*, for forming the touch area 13 and surrounding the display area 22. In this way, the scattering dissipation of the sensing light sources generated by the two optomechanical components 100 of the first and second sensing modules 10*a*, 10*b* can be avoided even well.

The length of the reflective connector 12 is greater than the sum of a first shortest distance d1 between first sensing module 10*a* and the first fixing module 11*a*, a second shortest distance d2 between the first fixing module 11*a* and a second fixing module 11*b*, and a third shortest distance d3 between the second fixing module 11*b* and the second sensing module 10*b*. Thereby, the reflective connector 12 can run from the first sensing module 10*a*, by way of the first fixing module 11*a* and the second fixing module 11*b*, and to the second sensing module 10*b* sequentially. The sum of the first shortest distance d1, the second shortest distance d2, and the third shortest distance d3 is equivalent to the sum of the lengths of the left border 221, the bottom border 221, and the right border 221 of the display area 22. Thereby, as the size of the display 2 increases, the display area 22 of the display 2 increases accordingly. If the sum of the lengths of the left border 221, the bottom border 221, and the right border 221 is greater, the sum of the first shortest distance d1, the second shortest distance d2, and the third shortest distance d3 will be greater. Thereby, a longer reflective connector 12 should be reserved, so that the length of the reflective connector 12 can be adjusted according to the size of the display 2. As a consequence, the add-on touch device 1 according to the present embodiment can be adjusted according to the size of the display 2.

In order to make the add-on touch device 1 according to the present embodiment adjustable according to the size of the display 2, the unused reflective connector 12 should be stored in the sensing module or the fixing module. The housings 101 of the first sensing module 10*a* and the second sensing module 10*b* according to the present embodiment further comprise a scroll member 19, respectively. The first end 121 of the reflective connector 12 is fixed at the scroll member 19 inside the housing 101 of the first sensing module 10*a*; the second end 122 of the reflective connector 12 is fixed at the scroll member 19 inside the housing 101 of the second sensing module 10*b*. The scroll members 19 in the first and second sensing modules 10*a*, 10*b* can scroll and store the unused reflective connector 12 manually or automatically and stretch the reflective connector 12 between the first sensing module 10*a*, the first fixing module 11*a*, the second fixing module 11*b*, and the second sensing module 10*b*.

Figure 7:
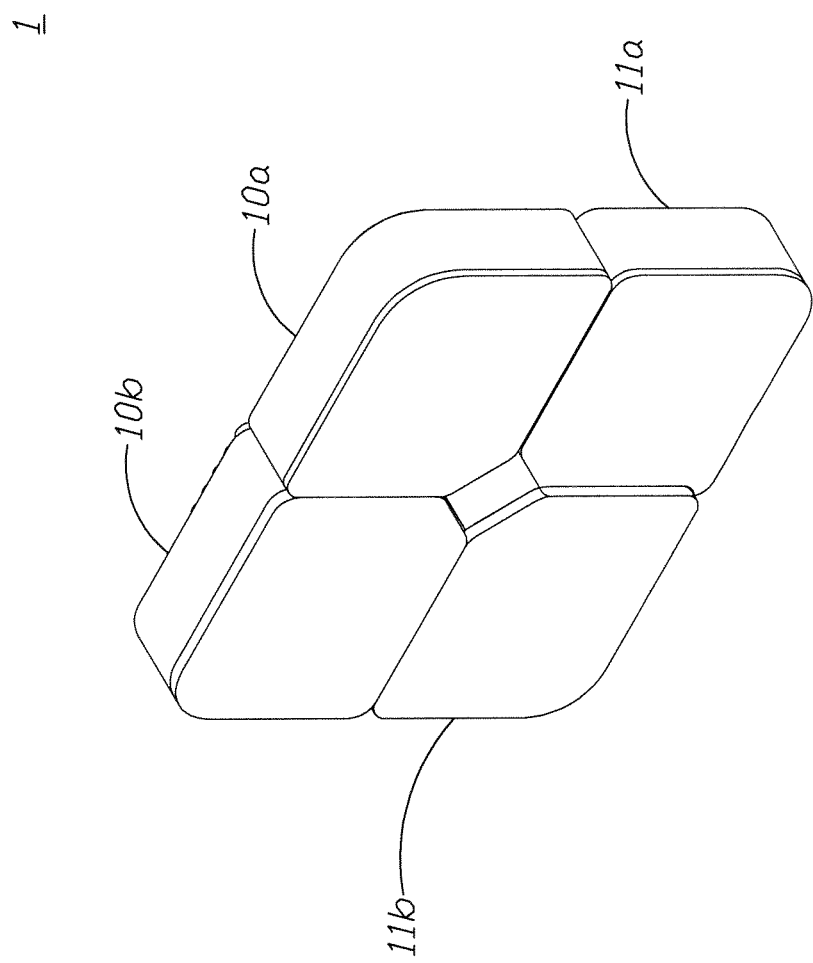
FIG. 7 shows a schematic diagram of storing the add-on touch device according the first embodiment of the present disclosure.

Please refer to FIG. 7, which shows a schematic diagram of storing the add-on touch device according the first embodiment of the present disclosure. As shown in the figure, when the add-on touch device 1 according to the present embodiment is not in use, the first sensing module 10a, the second sensing module 10b, the first fixing module 11a, and the second fixing module 11b are disassembled from the display 2, the two scroll members 19 of the first sensing module 10a and the second sensing module 10b scroll the reflective connector 12, drawing close the first sensing module 10a, the second sensing module 10b, the first fixing module 11a, and the second fixing module 11b, shrinking the volume of the add-on touch device 1, and reducing the occupied space when the add-on touch device 1 is stored.

Figure 8:
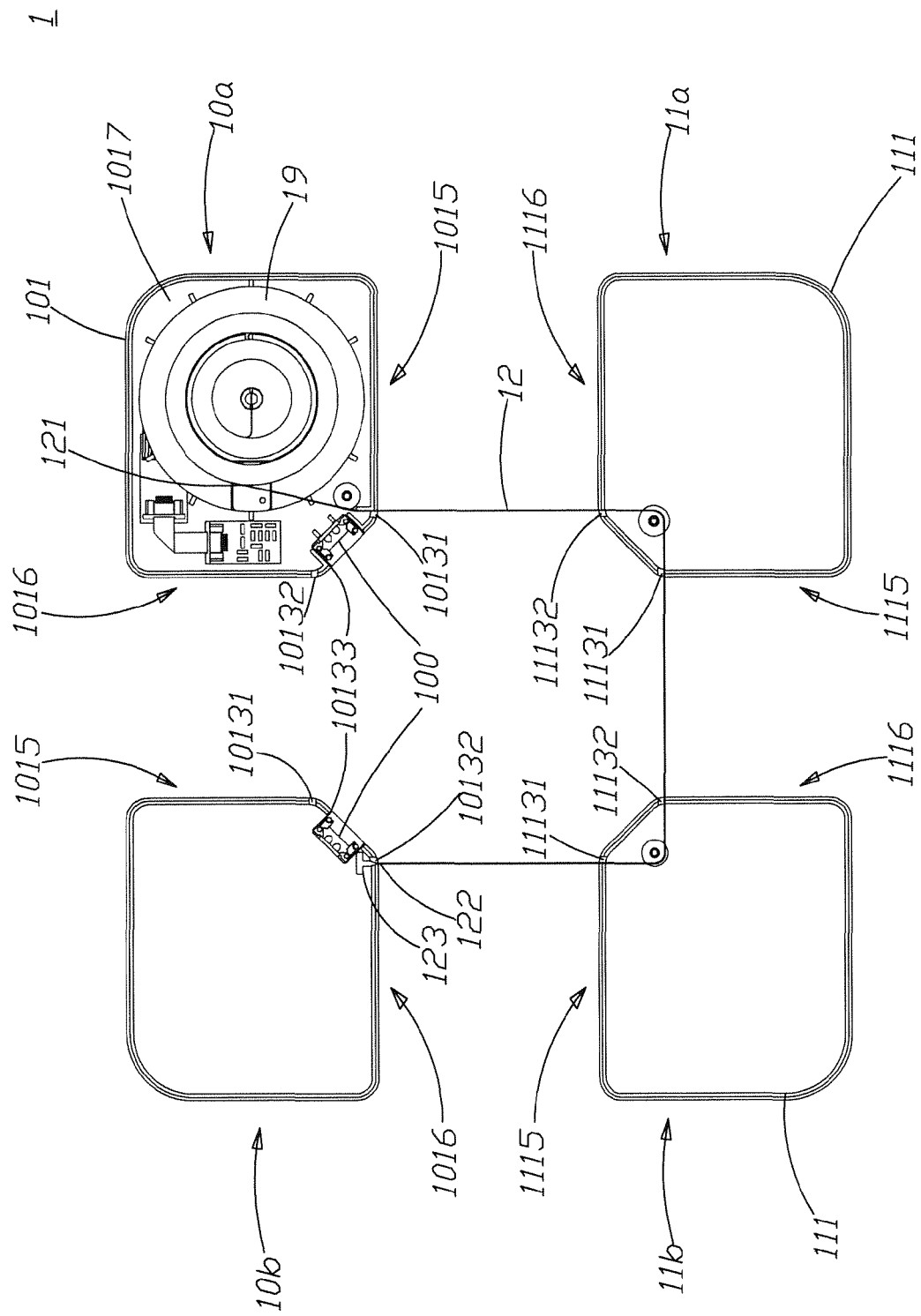
FIG. 8 shows a schematic diagram inside the add-on touch device according the second embodiment of the present disclosure.

Please refer to FIG. 8, which shows a schematic diagram inside the add-on touch device according the second embodiment of the present disclosure. As shown in the figure, the difference between the present embodiment and the first one is that, according to the present embodiment, the scroll member 19 is disposed in the housing 101 of the first sensing module 10a only. The first end 121 of the reflective connector 12 is fixed at the scroll member 19; the reflective connector 12 rolls up at the scroll member 19; the second end 122 of the reflective connector 12 is fixed at the second opening 10132 of the housing 101 of the second sensing module 10b. Besides, the second end 122 of the reflective connector 12 further includes a block member 123 located at the second opening 10132 of the second sensing module 10b for preventing the second end 122 of the reflective connector 12 from coming off the second opening 10132 of the second sensing module 10b. Alternatively, the scroll member 19 can be disposed in the housing 101 of the second sensing module 10b. The second end 122 of the reflective connector 12 is fixed at the scroll member 19; the reflective connector 12 rolls up at the scroll member 19; the first end 121 of the reflective connector 12 is fixed at the first opening 10131 of the housing 101 of the first sensing module 10a. Besides, the first end 121 of the reflective connector 12 further includes a block member 123 located at the first opening 10131, which means that the scroll member 19 can be disposed in one of the plurality of sensing modules. Thereby, the unused reflective connector 12 rolls up in the sensing module having the scroll member 19 for stretching the reflective connector 12 pass through the plurality of sensing modules and the plurality of fixing modules.

Figure 9:
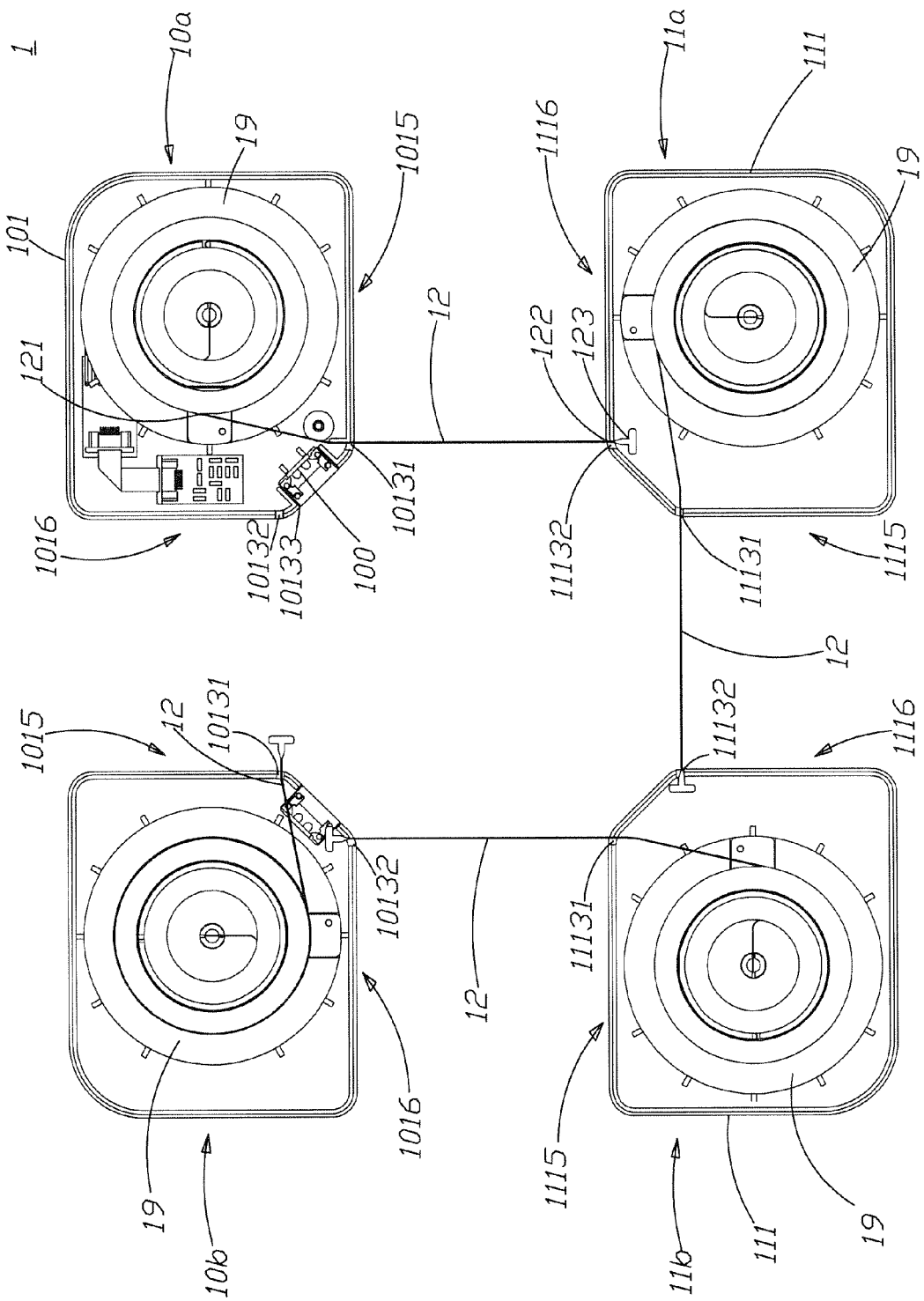
FIG. 9 shows a schematic diagram inside the add-on touch device according the third embodiment of the present disclosure.

Please refer to FIG. 9, which shows a schematic diagram inside the add-on touch device according the third embodiment of the present disclosure. As show in the figure, the two sensing modules and the two fixing modules according to the first embodiment are connected in series using a single reflective connector 12. According to the present embodiment, the two sensing modules and the two fixing modules are connected using a plurality of reflective connectors 12. That is to say, the first sensing module 10a is connected with the first fixing module 11a using a reflective connector 12; the first fixing module 11a is connected with the second fixing module 11b using a reflective connector 12; and the second fixing module 11a is connected with the second sensing module 10a using a reflective connector 12.

According to the present embodiment, the first sensing module 10a, the second sensing module 10b, the first fixing module 11a, and the second fixing module 11b all include the scroll member 19 and the reflective connector 122. Here, the first sensing module 10a is taken for example. The first end 121 of the reflective connector 12 of the first sensing module 10a is fixed at the scroll member 19 of the first sensing module 10a. The reflective connector 12 rolls up at the scroll member 19. The second end 122 of the reflective connector 12 passes and exits the first opening 10131 of the first sensing module 10. The second end 122 of the reflective connector 12 include the block member 123. As the reflective connector 12 of the first sensing module 10a is connecting to the first fixing module 11a, the reflective connector 12 is pulled out from the first sensing module 10a. The block member 123 of the reflective connector 12 is connected to and blocked at the second opening 11132 of the first fixing module 11a. The length of the reflective connector 12 is adjusted according to the shortest distance between the first sensing module 10a and the first fixing module 11a when they are fixed on the edges of the display. The connections of the scroll members 19 in the first fixing module 11a, the second fixing module 11b, and the second sensing module 10b with the reflective connectors 12 are the same as the connection of the scroll member 19 in the first sensing module 10a with the reflective connector 12. Hence, the details will not be described again. Furthermore, the connection between the first fixing module 11a and the second fixing module 10b, the connection between the second fixing module 11b and the second sensing module 10b, and the connection between the second sensing module 10b and the first sensing module 10a are the same as the connection between the first sensing module 10a and the first fixing module 11a. Thereby, their details will not be described either. In addition, according to the present embodiment, the second sensing module 10b is connected with the first sensing module 10a.

Figure 10:
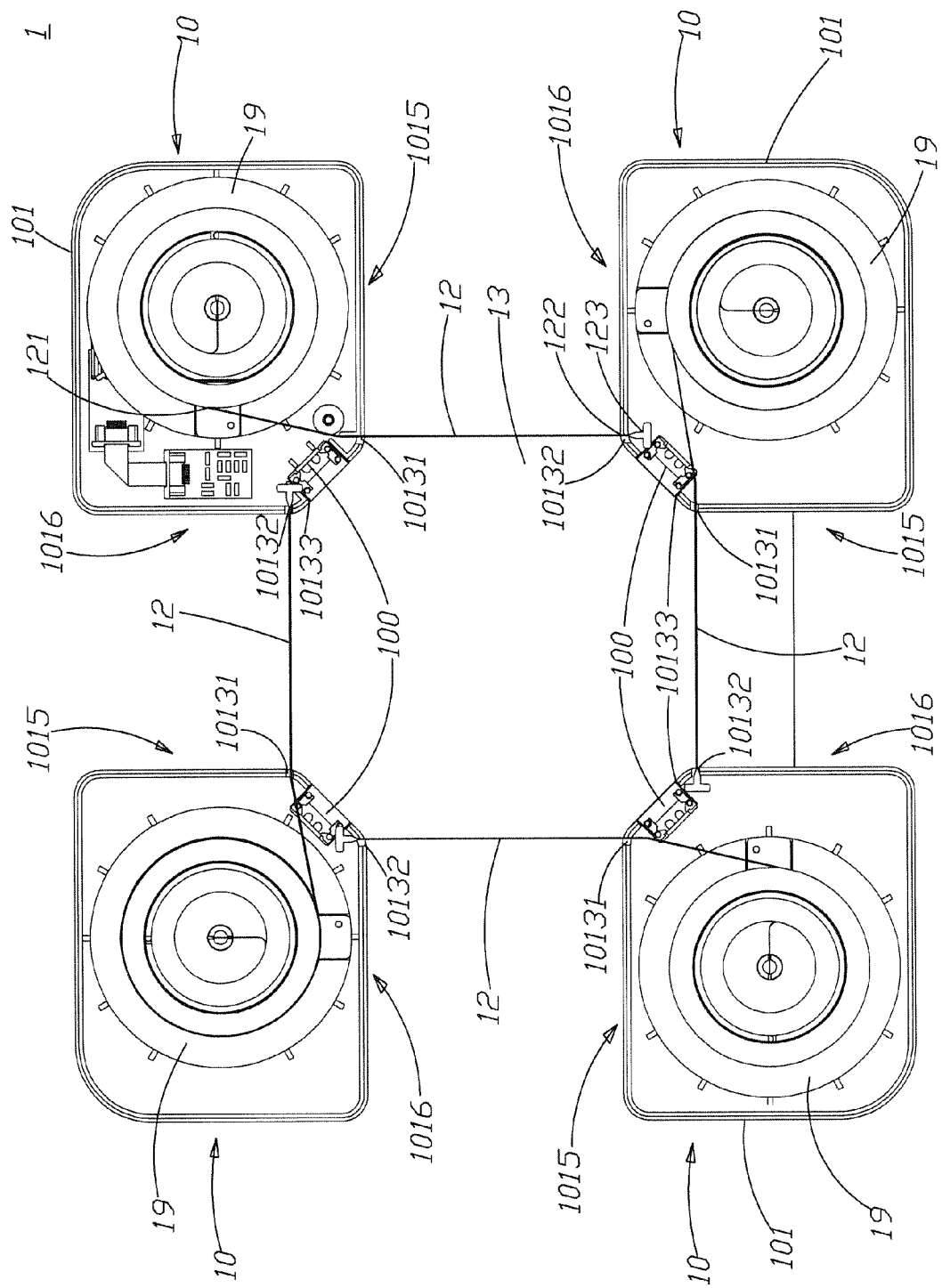
FIG. 10 shows a schematic diagram inside the add-on touch device according the fourth embodiment of the present disclosure.

Please refer to FIG. 10, which shows a schematic diagram inside the add-on touch device according the fourth embodiment of the present disclosure. As shown in the figure, the difference between the present embodiment and the third embodiment is that the two fixing modules according to the present embodiment are replaced by sensing modules 10. In other words, the add-on touch device 1 according to the present embodiment has four sensing modules 10. The structure of the sensing modules 10 according to the present embodiment is identical to the structure of the first sensing module 10a according to the third embodiment. Hence, the details will not be described. The add-on touch device 1 according to the present embodiment adopts four sensing modules 10. When the four sensing modules 10 are disposed at the four corners, the two optomechanical components 100 in the two sensing modules 10 located at the bottom left and bottom right corners of the display will generate sensing light sources emitting towards the upper right and upper left directions of the display. Thereby, the reflective connector 12 in the sensing module 10 at the upper left corner of the display is connected to the sensing module 10 at the upper right corner of the display for forming the closed touch area 13 and avoiding reduced sensing accuracy of the sensing light sources generated by the plurality of optomechanical component 100 of the plurality of sensing modules 10 due to scattering. Alternatively, the add-on touch device 1 according to the present embodiment can adopt a single reflective connector 12 for connecting the plurality of sensing modules 10 like the second embodiment. The details will not be described again.

Figure 11:
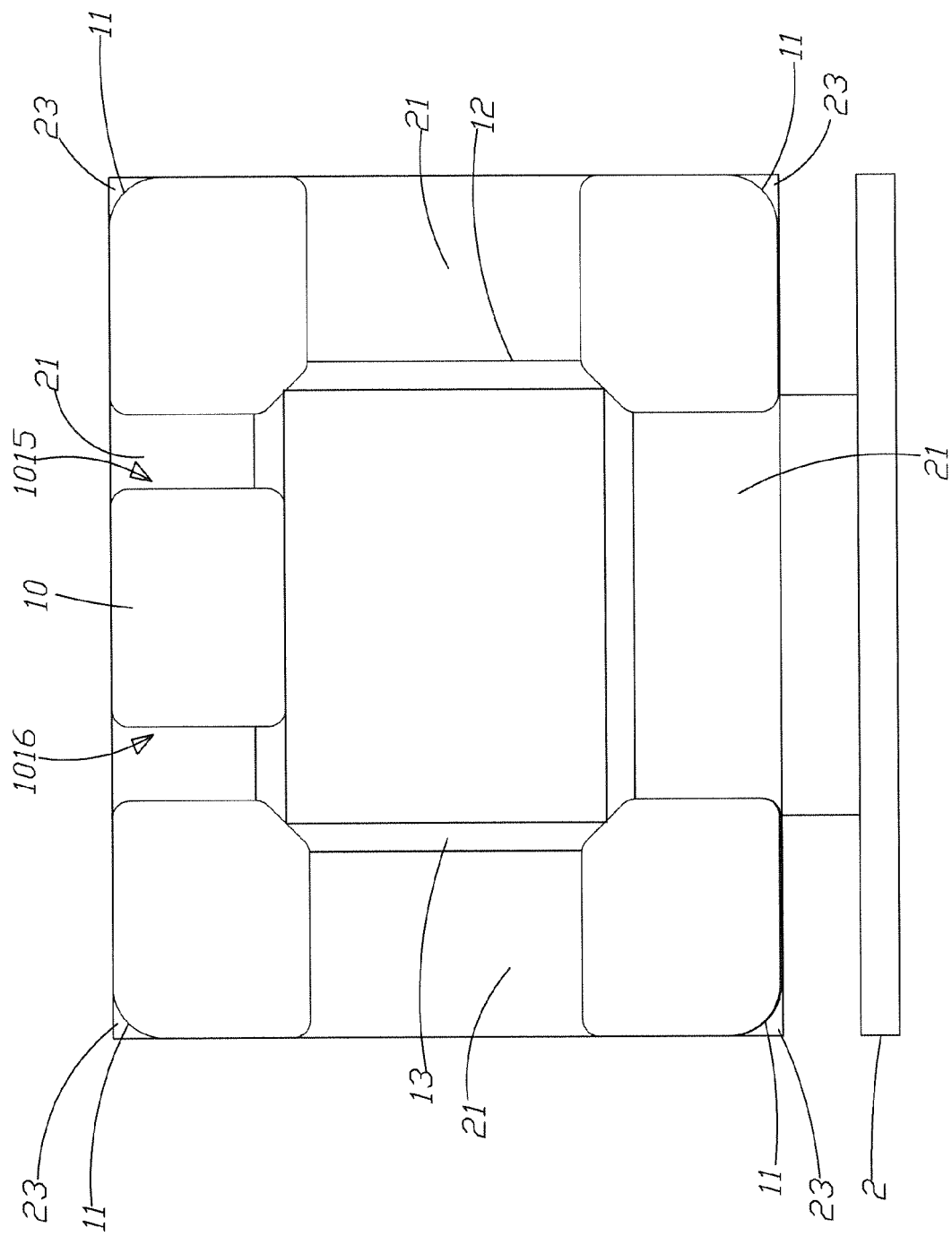
FIG. 11 shows a usage status diagram of the add-on touch device according the fifth embodiment of the present disclosure.

Please refer to FIG. 11, which shows a usage status diagram of the add-on touch device according the fifth embodiment of the present disclosure. As shown in the figure, the difference between the present embodiment and the previous one is that the add-on touch device 1 according to the present embodiment adopts a single sensing module 10 only. The add-on touch device 1 according to the present embodiment has four fixing modules 11 disposed on the four edges 21 of the display 2 and located on the four corners 23 of the display 2, respectively. The sensing module 10 is disposed between the fixing module 11 located at the upper right corner 23 of the display 2 and the fixing module 11 located at the upper left corner 23 of the display 2. Then the sensing module 10 uses a reflective connector 12, together with the plurality of fixing modules 11, to form a touch area 13. In addition, the sensing module 10 is disposed at the center position between the fixing module 11 located at the upper right corner 23 of the display 2 and the fixing module 11 located at the upper left corner 23 of the display 2, so that the sensing range of the sensing module 10 can cover the touch area 13, thus sensing the position in the display area 22 of the display 2 touched by a user in the touch area 13. The structure of the sensing module 10 according to the present embodiment is almost identical to the structure of the sensing module 10 according to the first embodiment. The difference is that the extension directions of the first side 1015 and second side 1016 of the sensing module 10 according to the first embodiment are perpendicular; the extension directions of the first side 1015 and second side 1016 of the sensing module 10 according to the present embodiment are parallel. Hence, the details of the sensing module 10 will not be described further.

Figure 12:
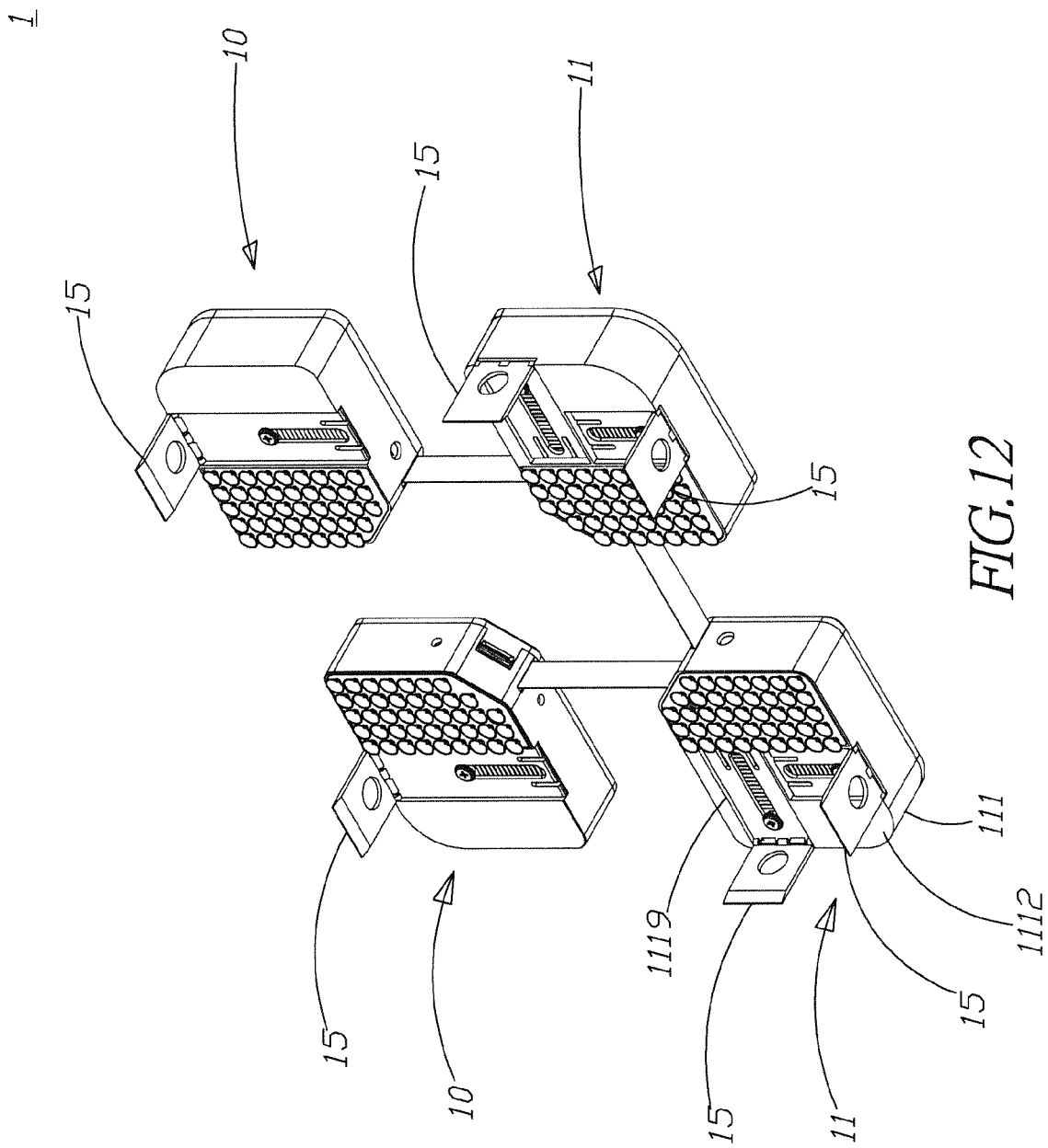
FIG. 12 shows a three-dimensional view of the add-on touch device according the sixth embodiment of the present disclosure.
Figure 13:
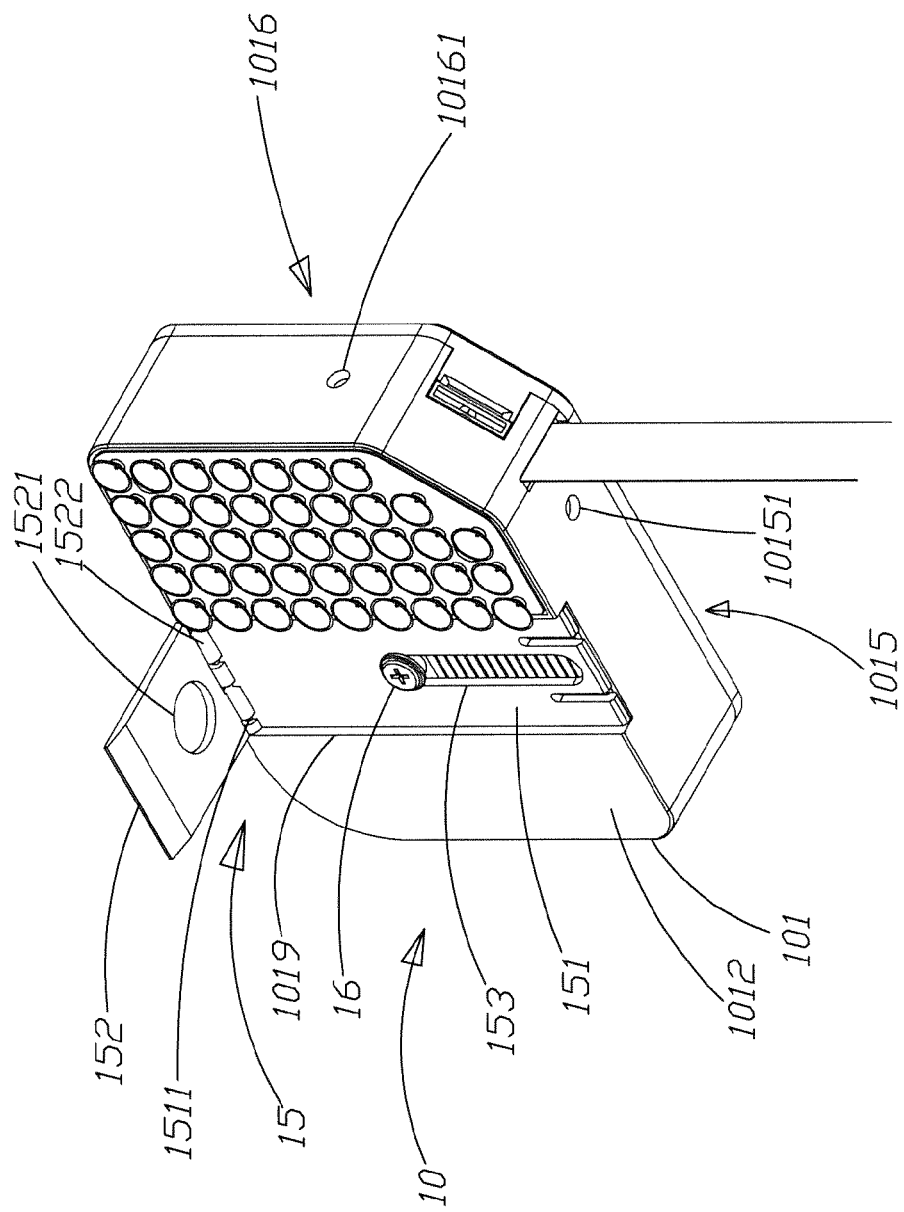
FIG. 13 shows a schematic diagram of the sensing module according the sixth embodiment of the present disclosure.

Please refer FIG. 12 and FIG. 13, which show a three-dimensional view of the add-on touch device and a schematic diagram of the sensing module according the sixth embodiment of the present disclosure. As shown in the figures, the difference between the present embodiment and the first embodiment is that the plurality of sensing modules 10 and the plurality of fixing modules 11 according to the present embodiment have at least a positioning member 15. In the following, the sensing module 10 will be used for description. The positioning member 15 is disposed on the second surface 1012 of the housing 101 of the sensing module 10 and located on one side of the fixing member 14. The positioning member 15 according to the present embodiment comprises a fixing board 151 and a positioning board 152. The positioning board 152 is disposed on one side of the fixing board 151 and perpendicular to the fixing board 151; the fixing board 151 is disposed on the second surface 1012 of the housing 101. The positioning board 152 projects from the second surface 1012 of the housing 101 towards the outer side of the housing 101 and is close to the sidewall 1013 located between the first side 1015 and second side 1016 of the housing 101. In addition, the surface of the positioning board 152 is parallel with the sidewall 1013 between the first and second sides 1015, 1016.

Figure 14:
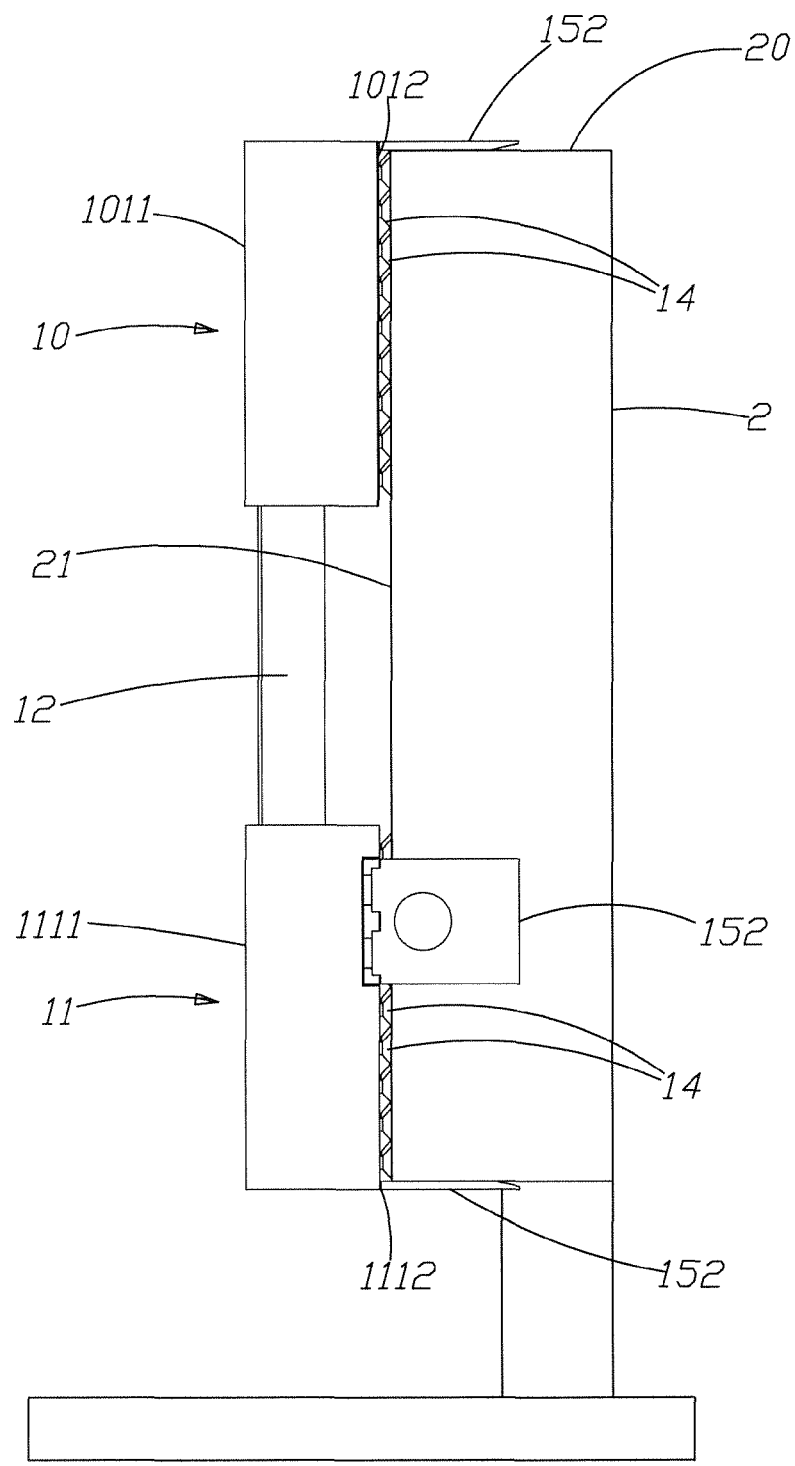
FIG. 14 shows a usage status diagram of the add-on touch device according the sixth embodiment of the present disclosure.

Please refer to FIG. 14, which shows a usage status diagram of the add-on touch device according the sixth embodiment of the present disclosure. As shown in the figure, as the sensing module 10 is disposed on the edge 21 of the display 2, the fixing members 14 on the second surface 1012 of the housing 101 of the sensing module 10 are fixed on the edge 21 of the display 2; the positioning board 152 of the positioning member 15 presses against the border 20 of the display 2 for positioning the sensing module 10 on the edge 21 of the display 2. The positioning board 152 of the positioning member 15 further includes a fixing part 1521. According to the present embodiment, the fixing part 1521 is a fixing hole. When the positioning board 152 presses against the border 20 of the display 2, a lock member (not shown in the figure) can used for passing through the fixing part 1521 and being locked on the border 20 of the display 2, and thus fixing the sensing module 10 to the display 2.

Please refer again to FIG. 13. The width of the edge 21 of the display 2 is greater or smaller than the width or length of the housing 101 of the sensing module 10. Thereby, the position of the positioning board 152 of the positioning member 15 has to be adjusted. The second surface 1012 of the housing 101 of the sensing module 10 further includes a sliding groove 1019 and a limiter 16. The fixing board 151 of the positioning member 15 is disposed in the sliding groove 1019, so that the positioning member 15 can move linearly towards the outer side of the housing 101 for pressing against the border 20 of the display 2. The limiter 16 is disposed in the sliding groove 1019. The fixing board 151 of the positioning member 15 has a limiting groove 153 corresponding to the limiter 16. The limiter 16 is located in the limiting groove 153 for limiting the traveling distance of the positioning member 15 towards the outer side of the housing 101, and thus avoiding the positioning member 15 from coming off the sliding groove 1019.

In addition, the fixing board 151 and the positioning board 152 of the positioning member 15 include a first pivot part 1511 and a second pivot part 1522, respectively. The second pivot part 1522 of the positioning board 152 can be pivoted at the first pivot part 1511 of the fixing board 151 for enabling the positioning board 152 to rotate with respect to the fixing board 151. Thereby, while using the sensing module 10, the positioning board 152 can be perpendicular to the fixing board 151 for pressing against the border 20 of the display 2. While disassembling the sensing module 10 from the display 2, the positioning board 152 rotates towards the fixing board 151, so that the positioning board 152 can cover the fixing board 151 and be stored in the sliding groove 1019 of the housing 101. As a consequence, the volume of the sensing module 10 is shrunk, saving the space for storage. The positioning member 15 and the limiter 16 can be disposed on the second surface 1112 of the housing 111 of the fixing module 11 as well. The second surface 1112 of the housing 111 of the fixing module 11 also includes a sliding groove 1119. The positioning member 15 is disposed slidably in the sliding groove 1119, as shown in FIG. 12. The detailed structures of the positioning member 15 and the limiter 16 will not be described further here.

Figure 15:
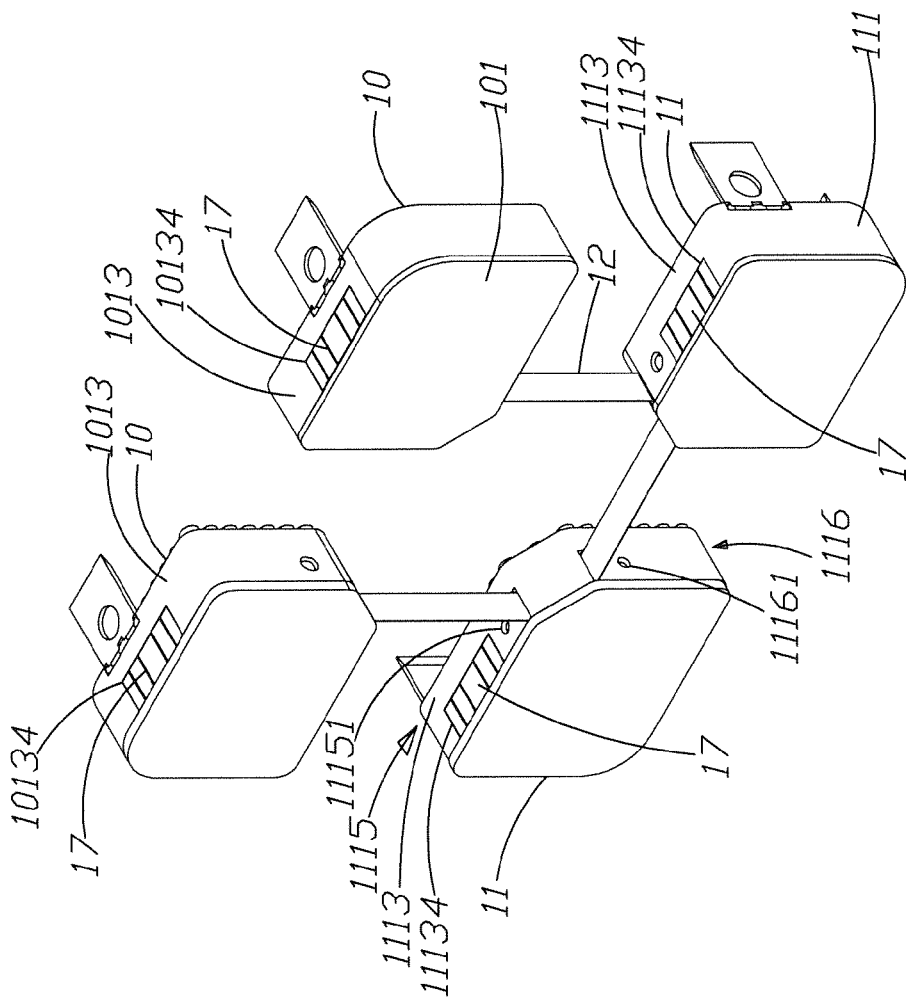
FIG. 15 shows another three-dimensional view of the add-on touch device according the sixth embodiment of the present disclosure.

Please refer to FIG. 15, which shows another three-dimensional view of the add-on touch device according the sixth embodiment of the present disclosure. As shown in the figure, in order to make sure if the disposition positions of the sensing modules 10 and the fixing module 11 are correct, the plurality of sensing modules 10 and the plurality of fixing modules 11 further include a level inspection device 17, such as a level, respectively. In the following, the sensing module 10 is used for example. The level inspection device 17 is disposed on the sidewall 1013 of the housing 101 of the sensing module 10 in parallel with the horizontal level. According to the present embodiment, the level inspection device 17 is embedded in the housing 101. The sidewall 1013 in parallel with the horizontal level has a fourth opening 10134. The level inspection device 17 corresponds to the fourth opening 10134 for exposing the level inspection device 17. The user can observe the inspection result of the level inspection device 17 through the fourth opening 10134 and judges if the disposal position of the sensing module 10 is correct according to the inspection result. When the sensing module 10 is disposed on the edge 21 of the display 2, as shown in FIG. 14, the sidewall 1013 of the housing 101 having the level inspection device 17 corresponds to the horizontal border 20 of the display 2. The user inspects the inspection result of the level inspection device 17 for judging if the sensing module 10 is parallel with the horizontal border 20 of the display 2. The level inspection device 17 can be disposed at the fixing module 11 as well. The level inspection device 17 is disposed on the sidewall 1113 of the housing 111 in parallel with the horizontal level. The housing 111 also has a fourth opening 11134. The level inspection device 17 is disposed in the housing 111 and corresponds to the fourth opening 11134. The details will not be repeated here.

Figure 16:
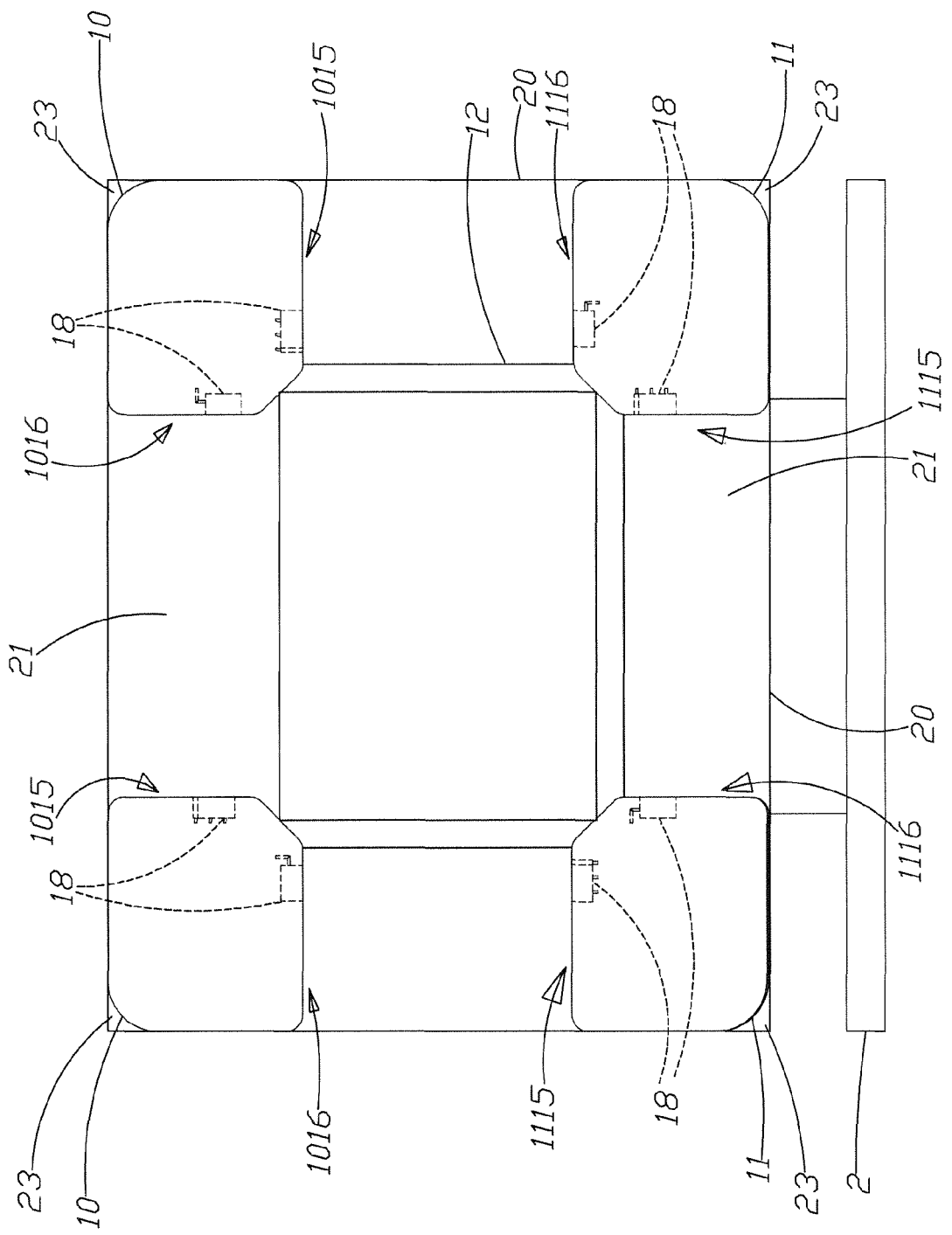
FIG. 16 shows a usage status diagram of the add-on touch device according the sixth embodiment of the present disclosure.

Please refer to FIG. 16, which shows a usage status diagram of the add-on touch device according the sixth embodiment of the present disclosure. As shown in the figure, the level inspection device 17 can confirm if the sensing module 10 or the fixing module 11 is parallel with the horizontal border 20 of the display 2 only. In order to make the plurality of sensing modules 10 and the plurality of fixing modules 11 align on the same horizontal level or on the same vertical level, the plurality of sensing modules 10 and the plurality of fixing modules 11 include two infrared detection devices 18, respectively. In the following, the sensing module 10 is used for description. Please refer to FIG. 13. The two infrared detection devices 18 are disposed in the housing 101 of the sensing module 10, close to the first side 1015 and the second side 1016 of the housing 101, and correspond to a first hole 10151 on the sidewall 1013 of the first side 1015 of the housing 101 and a second hole 10161 on the sidewall 1013 of the second side 1016 of the housing 101, respectively. The infrared detection device 18 on the first side 1015 is the transmitting side; the infrared detection device 18 on the second side 1016 is the receiving side. Besides, the housing 111 of the fixing module 11 also includes two infrared detection devices 18. A first hole 11151 and a second hole 11161 are also included. The infrared detection device 18 used as the transmitting side is close to the first side 1115 of the housing 111 and corresponds to the first hole 11151, as shown in FIG. 15; the infrared detection device 18 used as the receiving side is close to the second side 1116 of the housing 111 and corresponds to the second hole 11161, as shown in FIG. 15.

The plurality of sensing modules 10 and the plurality of fixing modules 11 are disposed on the edges 21 of the display 2. In addition, after the initial positioning by the plurality of the level inspection devices 17 of the plurality of sensing modules 10 and the plurality of fixing modules 11, the infrared detection device 18 located on the first side 1015 of the sensing module 10 at the upper right corner 23 of the display 2 emits the inspection light source to the second side 1116 of the fixing module 11 at the bottom right corner 23 of the display 2. As the infrared detection device 18 located on the second side 1116 of the fixing module 11 at the bottom right corner 23 of the display 2 receives the inspection light source emitted by the infrared detection device 18 located on the first side 1015 of the sensing module 10 at the upper right corner 23 of the display 2, the infrared detection device 18 located on the second side 1116 of the fixing module 11 at the bottom right corner 23 of the display 2 generates an detection signal and transmits the detection signal to the computer for completing positioning the sensing module 10 at the upper right corner 23 of the display 2 as well as the fixing module 11 at the bottom right corner 23 of the display 2, and thus confirming that the sensing module 10 at the upper right corner 23 of the display 2 and the fixing module 11 at the bottom right corner 23 of the display 2 align to the same vertical level. It means that the reflective connector 12 between the sensing module 10 at the upper right corner 23 of the display 2 and of the fixing module 11 at the bottom right corner 23 of the display 2 is perpendicular to the sensing module 10 and the fixing module 11.

Likewise, as the infrared detection device 18 located on the second side 1116 of the sensing module 10 at the upper right corner 23 of the display 2 receives the inspection light source emitted by the infrared detection device 18 located on the first side 1015 of the sensing module 10 at the upper left corner 23 of the display 2, the infrared detection device 18 located on the second side 1116 of the sensing module 10 at the upper right corner 23 of the display 2 also generates an detection signal and transmits the detection signal to the computer for completing positioning the sensing module 10 at the upper right corner 23 of the display 2 as well as the sensing module 10 at the upper left corner 23 of the display 2, and thus confirming that the sensing module 10 at the upper right corner 23 of the display 2 and the sensing module 10 at the upper left corner 23 of the display 2 align to the same horizontal level. It means that the reflective connector 12 between the sensing module 10 at the upper right corner 23 of the display 2 and of the sensing module 11 at the upper left corner 23 of the display 2 is perpendicular to the two sensing modules 10. The positioning between the fixing module 11 at the bottom left corner 23 of the display 2 and the sensing module 10 at the upper left corner 23 of the display 2 and between the fixing module 11 at the bottom left corner 23 of the display 2 and the fixing module 11 at the bottom right corner 23 are identical to the method described above. Hence, the details will not be described again.

The plurality of optomechanical components and infrared detection devices 18 of the plurality of sensing modules 10 are connected electrically with the computer via at least a transmission interface, for example, the USB, for transmitting the sensing signal generated by the plurality of optomechanical components and the detection signals generated by the infrared detection devices 18 to the computer. The computer judges if the positions of the plurality of sensing modules 10 and the plurality of fixing modules 11 are already calibrated according to the display content of the display 2 and the detection signals. In addition to the above method for achieving signal transmission, the reflective connector 12 can alternatively have a flexible printed circuit board on a surface. The plurality of optomechanical components and the infrared detection devices 18 are connected electrically with the flexible circuit board for transmitting the sensing signals and the detection signals to the computer.

To sum up, the present disclosure provides an add-on touch device, which comprises at least a sensing module and multiple fixing modules. Alternatively, the add-on touch device comprises four and more sensing modules. The sensing module and the plurality of fixing modules or the plurality of sensing modules are disposed on the display. Then flexible reflective connectors are used for connecting the sensing module and the plurality of fixing modules or connecting the plurality of sensing modules. The reflective connectors surround the display area of the display and forming the touch area. The sensing module senses the touched position in the display area by the user in the touch area for achieving the effect of touch control. The reflective connectors can be adjusted to appropriate lengths according to the size of the display for enabling the add-on touch device according to the present disclosure applicable to displays of various sizes. The reflective connectors can be stored in the plurality of sensing modules or/and the plurality of fixing modules, and thus shrinking the volume of the add-on touch device according to the present disclosure and reducing the space occupied by the add-on touch device according to the present disclosure during storage.

Accordingly, the present disclosure conforms to the legal requirements owing to its novelty, nonobviousness, and utility. However, the foregoing description is only embodiments of the present disclosure, not used to limit the scope and range of the present disclosure. Those equivalent changes or modifications made according to the shape, structure, feature, or spirit described in the claims of the present disclosure are included in the appended claims of the present disclosure.

The invention claimed is:

1. An add-on touch device, used on a display, comprising:
at least two sensing modules, disposed on two of four edges of said display, and each sensing module having an optomechanical component; and
at least two fixing modules, disposed on other of the four edges of said display, said plurality of sensing modules and said plurality of fixing modules connected by at least a reflective connector for forming a touch area corresponding to a display area of said display, and said plurality of optomechanical components facing to said touch area, wherein said reflective connector is flexible;
wherein one of said two sensing modules comprises a scroll member, a first end or a second end of said reflective connector fixed at said scroll member, and said scroll member rolling up said reflective connector.

2. The add-on touch device of claim 1, wherein said first end of said reflective connector is fixed at one of said sensing modules, wherein said sensing modules having at least one opening; said second end of said reflective connector passes though one of said at least one opening of the sensing module and passes through said plurality of fixing modules; and said second end of said reflective connector is fixed on a second side of the other sensing module.

3. The add-on touch device of claim 2, wherein said two sensing modules and said two fixing modules comprise, respectively:
a housing, having a first opening and a second opening, said first opening located on said first side of said housing, and said second opening located on said second side of said housing; and
at least a fixing member, disposed on a surface of said housing, and fixed on the edge of said display.

4. The add-on touch device of claim 3, wherein said first end of said reflective connector is disposed in said housing of one of said two sensing modules; and said second end of said reflective connector passes and exits said first opening of said sensing module, passes through said second opening and said first opening of said plurality of fixing modules sequentially, and is fixed at said second opening of the other sensing module.

5. The add-on touch device of claim 4, wherein said scroll member is disposed in said housing.

6. The add-on touch device of claim 4, wherein said two sensing modules further comprises, respectively, a scroll member, disposed in said housing, said first end and said second end of said reflective connector fixed at said two scroll members, respectively, and said two scroll members rolling up said reflective connector.

7. The add-on touch device of claim 1, wherein said two sensing modules and said two fixing modules have said reflective connector, respectively; first ends of said plurality of reflective connectors are fixed at said two sensing modules and said two fixing modules, respectively; second ends of said plurality of reflective connectors pass and exit first sides of said two sensing modules and said two fixing modules, respectively, and are fixed on second sides of the neighboring sensing module or fixing module, respectively.

8. The add-on touch device of claim 1, wherein said plurality of sensing modules and said plurality of fixing modules comprise, respectively:
a housing, having a first opening and a second opening, said first opening located on said first side of said housing, and said second opening located on said second side of said housing; and
at least a fixing member, disposed on a surface of said housing, and fixed on the edge of said display;
where said first end of said reflective connector is fixed in said housing; and
a second end of said reflective connector passes and exits said first opening of said housing.

9. The add-on touch device of claim 8, wherein said two sensing modules and said two fixing modules further comprise, respectively, a scroll member, disposed in said housing, said first end of said reflective connector fixed at said scroll member, and said scroll member rolling up said reflective connector.

10. The add-on touch device of claim 8, wherein said second ends of said plurality of reflective connectors of said two sensing modules and said two fixing modules are fixed at said second opening of the neighboring sensing module or fixing module, respectively.

11. The add-on touch member of claim 10, wherein said second end of said reflective connector has a block member connected to and blocked at said second opening.

12. The add-on touch member of claim 8, wherein said housing of said sensing module has a third opening facing to said touch area, and said optomechanical component is disposed in said housing and corresponding to said third opening.

13. The add-on touch member of claim 8, wherein said plurality of sensing modules and said plurality of fixing modules further comprise, respectively, a level inspection device disposed on the sidewall of said housing in parallel with a horizontal level.

14. The add-on touch member of claim 13, wherein said level inspection device is disposed in said housing; the sidewall of said housing in parallel with the horizontal level has a fourth opening; and said level inspection device corresponds to said fourth opening.

15. The add-on touch member of claim 8, wherein said two sensing modules and said two fixing modules further comprise, respectively, two infrared detection devices disposed in said housing and close to said first side and said side of said housing, respectively.

16. The add-on touch member of claim 15, wherein said infrared detection device close to said first side of said housing is the transmitting side; and said infrared detection device close to said second side of said housing is the receiving side.

17. The add-on touch member of claim 16, wherein said first side of said housing has a first hole and said second side of said housing has a second hole; said infrared detection device of the transmitting side corresponds to said first hole; and said infrared detection device of the receiving side corresponds to said second hole.

18. The add-on touch member of claim 8, wherein said plurality of sensing modules and said plurality of fixing modules further comprise, respectively, at least a positioning member, disposed on said surface of said housing, and projecting from said surface of said housing for pressing against the boder of said display.

19. The add-on touch member of claim 18, wherein said positioning member comprises a fixing board and a positioning board; said positioning board is disposed on and perpendicular to said fixing board; said fixing board is disposed on said housing; and said positioning boards is parallel with the sidewall between said first side and said second side of said housing.

20. The add-on touch member of claim 19, wherein said fixing board has a first pivot part and said positioning part has a second pivot part; said second pivot part is pivoted at said first pivot part; and said positioning boards rotates with respect to said fixing board.

21. The add-on touch member of claim 19, wherein said housing has a sliding groove on said surface; said fixing board is disposed slidably in said sliding groove; said sliding groove includes a limiter; said fixing board has a limiting groove; and said limiter is located in said limiting groove.

22. The add-on touch member of claim 19, wherein said positioning board has a fixing part fixed on the boder of said display.

23. A sensing module, comprising:
- a housing, having a first opening, a second opening, and a third opening, said first opening located on a first side of said housing, said second opening located on a second side of said housing, said third opening facing to a touch area, and a optomechanical component disposed in said housing and corresponding to said third opening;
- at least a fixing member, disposed on a surface of said housing, and fixed on the edge of a display;
- a reflective connector, having a first end fixed in said housing, and having a second end passing and exiting said first opening of said housing, wherein said reflective connector is flexible; and
- a scroll member, disposed in said housing, said first end of said reflective connector fixed at said scroll member, and said scroll member rolling up said reflective connector.

24. The sensing module of claim 23, wherein said second end of said reflective connector has a block member.

* * * * *